(12) United States Patent
Westmoreland

(10) Patent No.: US 9,789,786 B2
(45) Date of Patent: *Oct. 17, 2017

(54) CHILD CAR SEAT SAFETY SYSTEM

(71) Applicant: Amber Westmoreland, Little Elm, TX (US)

(72) Inventor: Amber Westmoreland, Little Elm, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,650

(22) Filed: Sep. 27, 2016

(65) Prior Publication Data
US 2017/0015215 A1    Jan. 19, 2017

Related U.S. Application Data

(63) Continuation of application No. 14/995,767, filed on Jan. 14, 2016, now Pat. No. 9,457,716.

(60) Provisional application No. 62/103,327, filed on Jan. 14, 2015.

(51) Int. Cl.
| | |
|---|---|
| B60Q 1/00 | (2006.01) |
| B60N 2/00 | (2006.01) |
| B60C 9/00 | (2006.01) |
| B60N 2/28 | (2006.01) |
| B60H 1/00 | (2006.01) |
| B60J 1/17 | (2006.01) |

(52) U.S. Cl.
CPC .............. *B60N 2/002* (2013.01); *B60C 9/00* (2013.01); *B60H 1/00742* (2013.01); *B60J 1/17* (2013.01); *B60N 2/2812* (2013.01); *B60N 2002/2815* (2013.01)

(58) Field of Classification Search
CPC ......... B60Q 9/00; B60N 2/002; B60N 2/2812

USPC .......................................... 340/457.1, 539.15
See application file for complete search history.

(56) References Cited

U.S. PATENT DOCUMENTS

| | | | |
|---|---|---|---|
| 5,949,340 A | 9/1999 | Rossi | |
| 6,812,844 B1 | 11/2004 | Burgess | |
| 6,922,154 B2 | 7/2005 | Kraljic et al. | |
| 6,924,742 B2 * | 8/2005 | Mesina | B60N 2/002 340/457.1 |
| 6,930,614 B2 | 8/2005 | Rackham et al. | |

(Continued)

FOREIGN PATENT DOCUMENTS

WO    2009144687 A2    12/2009

OTHER PUBLICATIONS

Lusso, R., et al., Abstract of "Automobile safety—Child seat entrapment and mechatronic warning system," Advances in Automotive Control, vol. #5, Part #1, 2007, 1 page.

*Primary Examiner* — Kerri McNally

(57) ABSTRACT

Disclosed herein are various aspects of a buckle assembly for use with a child safety seat. The buckle assembly comprises a buckle sensor, the buckle sensor configured for determining whether fasteners of the child safety seat are secured into the buckle assembly; a processor coupled with the buckle sensor; and a transceiver coupled with the processor, the transceiver for communicating with a control system of a vehicle. The transceiver is configured to receive a signal from the control system, the signal indicating at least what gear the vehicle is in and whether the vehicle's ignition is "on" or "off"; and signal the control system after a first period of time has passed after receiving a signal that the vehicle's ignition is "off" and the fasteners remain secured into the buckle.

20 Claims, 2 Drawing Sheets

(56) References Cited

U.S. PATENT DOCUMENTS

Figure 1:
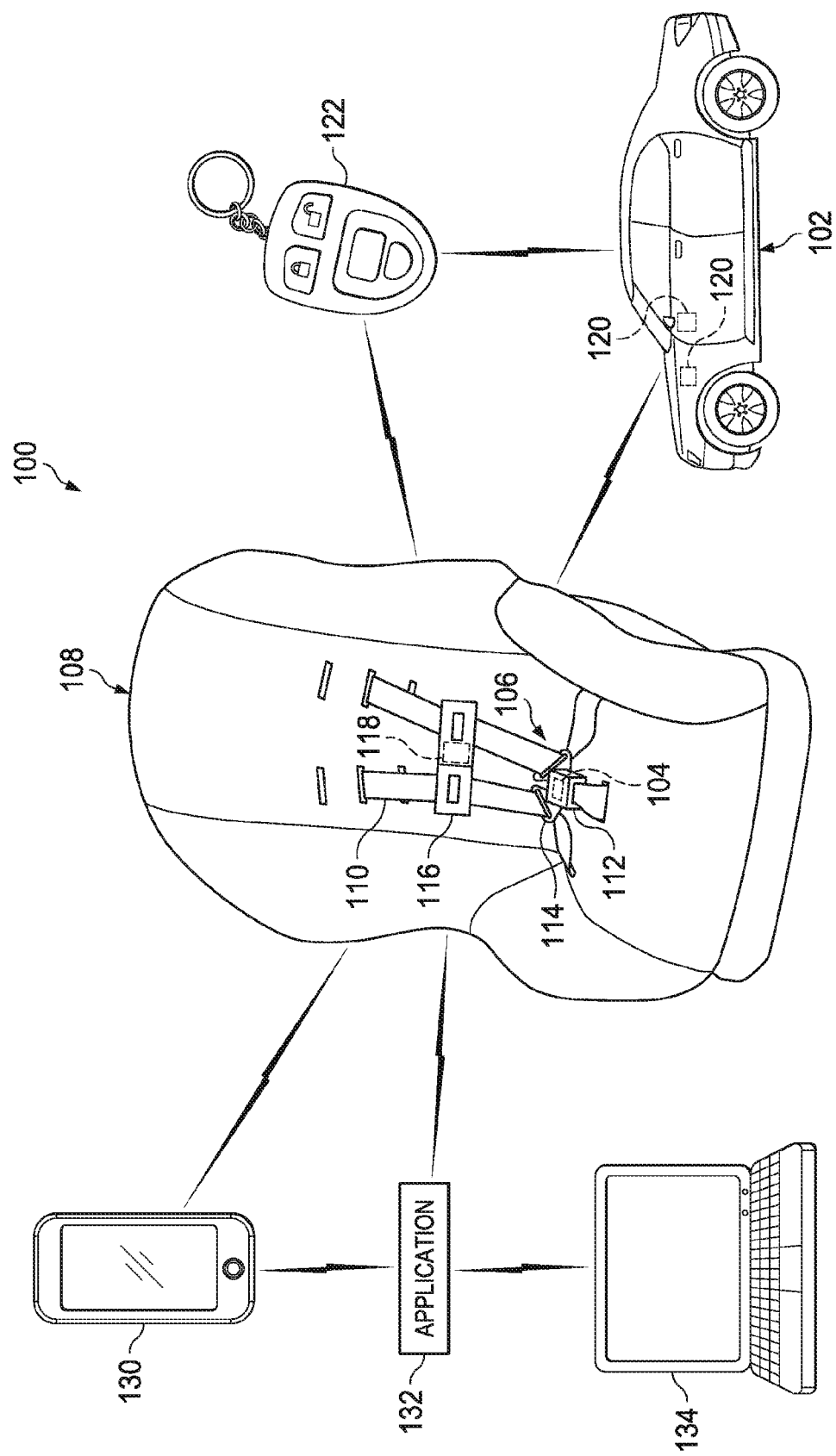

| | | |
|---|---|---|
| 7,106,203 B2 | 9/2006 | Edwards et al. |
| 7,218,218 B1 * | 5/2007 | Rogers .................. B60N 2/002 340/425.5 |
| 7,348,889 B2 | 3/2008 | Monzo et al. |
| 7,733,228 B2 | 6/2010 | Lee et al. |
| 8,212,665 B2 | 7/2012 | Schoenberg et al. |
| 8,232,874 B1 | 7/2012 | Aneiros et al. |
| 8,235,416 B2 | 8/2012 | Breed et al. |
| 8,618,926 B1 | 12/2013 | Thompson |
| 8,841,997 B2 | 9/2014 | Silveira |
| 9,457,716 B2 * | 10/2016 | Westmoreland ......... B60Q 9/00 |
| 2003/0122662 A1 | 7/2003 | Quinonez |
| 2005/0181743 A1 | 8/2005 | Lawson |
| 2006/0139159 A1 * | 6/2006 | Lee ....................... B60N 2/002 340/457 |
| 2007/0075574 A1 | 4/2007 | James |
| 2009/0079557 A1 * | 3/2009 | Miner .................... B60N 2/002 340/457.1 |
| 2014/0009291 A1 | 1/2014 | Requist et al. |
| 2014/0052342 A1 | 2/2014 | Seibert |
| 2014/0253314 A1 * | 9/2014 | Rambadt ................ B60N 2/002 340/457.1 |
| 2014/0259414 A1 | 9/2014 | Hayes et al. |

* cited by examiner

| CONDITION / ALERT | BUCKLE NOT PROPERLY FASTENED AND VEHICLE ON | BUCKLE UNFASTENED AND VEHICLE ON | BUCKLE STILL FASTENED BUT VEHICLE OFF | BUCKLE STILL FASTENED BUT VEHICLE OFF- TIME ELAPSED | BUCKLE STILL FASTENED BUT VEHICLE OFF- DISTANCE | BUCKLE BECOMES UNFASTENED BUT SEAT NOT IN VEHICLE- TIME ELAPSED AND/OR DISTANCE |
|---|---|---|---|---|---|---|
| CONTROL SYSTEM | X | X | X | X | X | |
| DASHBOARD ALERT | X | X | | | | |
| CAR HORN | | | | t1 | d1 | |
| WINDOWS | | | | t2 | d2 | |
| HVAC SYSTEM | | | | t3 | d3 | |
| KEY FOB | X | X | X | t1 | d1 | t4, d4 |
| SMART PHONE | X | X | X | t1, t2, t3 | d1, d2, d3 | t4, d4 |
| APP INTERFACE ON PC | | | | t3 | d3 | |

FIG. 2

CHILD CAR SEAT SAFETY SYSTEM

CLAIM OF PRIORITY

This application is a continuation of U.S. patent application Ser. No. 14/995,767, filed Jan. 14, 2016, entitled "CHILD CAR SEAT SAFETY SYSTEM," which claims priority to provisional application, U.S. Application No. 62/103,327, filed Jan. 14, 2015, entitled "CHILD CAR SEAT SAFETY SYSTEM," the entire contents of which are incorporated herein by reference.

TECHNICAL FIELD

This application is directed, in general, to child safety systems and, more specifically, to a child car seat safety system for use in motor vehicles.

BACKGROUND

Traffic safety laws require that certain passengers wear a safety belt while a vehicle is in motion. Children under a certain age and weight are required to be secured into safety seats. Certain seats may be either secured by a seat belt or secured onto anchors built into a vehicle, such as Lower Anchor and Tethers for Children (LATCH) systems.

Parents and caregivers of small children and infants may often experience lack of sleep, stress, and other distractions that may accompany caring for children. As a result, there have been examples where a parent or caregiver has reached their destination and exited the vehicle without realizing their child has been left unattended in the vehicle. The interior of vehicles can reach extreme temperatures in certain weather conditions, which combined with lack of airflow through the vehicle can cause an occupant, especially a young child, to lose consciousness quickly, and in some cases lead to death.

Accordingly, what is needed is car safety system and components thereof which alerts at least a driver of a vehicle that a child has been left in the vehicle unattended and also alert a driver when a child is not fastened properly into a safety seat.

SUMMARY

The present disclosure provides embodiments of a buckle assembly for use with a child safety seat. The buckle assembly comprises a buckle sensor, the buckle sensor configured for determining whether fasteners of the child safety seat are secured into the buckle assembly; a processor coupled with the buckle sensor; and a transceiver coupled with the processor, the transceiver for communicating with a control system of a vehicle. The transceiver is configured to receive a signal from the control system, the signal indicating at least what gear the vehicle is in and whether the vehicle's ignition is "on" or "off"; and signal the control system after a first period of time has passed after receiving a signal that the vehicle's ignition is "off" and the fasteners remain secured into the buckle.

In another embodiment a child safety system for use with a vehicle, the safety system comprises a control system coupled with the vehicle; a buckle for receiving fasteners of a child safety seat therein; a buckle sensor, the buckle sensor configured for determining whether the fasteners of the child safety seat are secured into the buckle; a processor coupled with the buckle sensor; and a transceiver coupled with the processor, the transceiver for communicating with the control system. The transceiver is configured to receive a signal from the control system, the signal indicating at least what gear the vehicle is in and whether the vehicle's ignition is "on" or "off"; and signal the control system after a first period of time has passed after receiving a signal that the vehicle's ignition is "off" and the fasteners remain secured into the buckle.

In another aspect, a child safety seat for securing a child while in a vehicle comprises one or more belts having fasteners thereon for fastening a child into the seat; at least one buckle assembly configured for receiving the fasteners therein; and a buckle sensor. The buckle sensor is configured for determining whether the fasteners are secured into the buckle assembly; and a transceiver, the transceiver configured for communicating with a control system of the vehicle, to send and receive signals from the control system, and send signals from the buckle sensor.

In another aspect, there is disclosed a child seat safety system comprising a child safety seat for securing a child while in a vehicle. The safety seat comprises one or more belts having fasteners thereon for fastening a child into the seat; at least one buckle assembly configured for receiving the fasteners therein; and a buckle sensor. The buckle sensor is configured for determining whether the fasteners are secured into the buckle assembly. The safety seat system also comprises a transceiver for communicating with a control system of the vehicle. The transceiver is configured to send and receive signals from the control system, and send signals from the buckle sensor. The safety system further comprises a processor for processing signals received from the buckle assembly and the control system, the processor configured to initiate alerts to the control system.

In another aspect, another embodiment of a child safety system is disclosed. The safety system comprises a child safety seat for securing a child while in a vehicle. The safety seat comprises one or more belts having fasteners thereon for fastening a child into the seat; at least one buckle assembly configured for receiving the fasteners therein; and a buckle sensor. The buckle sensor is configured for determining whether the fasteners are secured into the buckle assembly. The safety seat system also comprises a transceiver for communicating with a control system of the vehicle. The transceiver is configured to send and receive signals from the control system, and send signals from the buckle sensor. The car seat further comprises a processor embedded in the buckle assembly and coupled with the transceiver for processing signals received from the buckle assembly and the control system, the processor configured to initiate alerts to the control system. The safety system also comprises an interface for installation with the control system of the vehicle; and a key fob configured to receive signals from the control system, and provide an alert to a user.

BRIEF DESCRIPTION

Reference is now made to the following descriptions taken in conjunction with the accompanying drawings, in which:

FIG. 1 is a perspective view of a vehicle having a child car seat safety system secured therein according to the principles of the present disclosure; and FIG. 2 is a table representing conditions and alerts according to aspects of the child car seat safety system of the present disclosure.

DETAILED DESCRIPTION

Parents and caregivers can easily be distracted in many ways, which may cause them to reach a destination and exit the vehicle without realizing a child has been left in the back seat of the vehicle. While a parent may think they could never forget or endanger their child, there have been too many cases where a child has been left unattended in a vehicle and died as a result of the dangerous conditions that may develop inside a sealed car in various temperatures and weather conditions. Parenting and caregiver tips often suggest to leave a briefcase, bag, or other item in the backseat such that the caregiver must look back to retrieve the item before exiting the vehicle. However, if the parent or caregiver is already distracted, they may forget to either put an item in the backseat, or similarly, forget to retrieve the item placed there.

Another problem encountered by caregivers of young children may include improper fastening of safety belts on a child safety seat, or the buckle is unfastened while the vehicle is in motion. If a child is not fastened properly in a safety seat while the vehicle is in motion, serious injuries may occur if the vehicle in is an accident or encounters conditions that require unusual maneuvers, such as, for example, swerving on ice or to avoid an object.

Additionally, often parents may leave the child strapped into a car seat when the seat is out of the vehicle. For example, infant car seats often comprise a carrier in which the child is placed and fastened, and a receiver which remains fastened into the vehicle. The carrier may be configured to secure into a stroller, travel system, and the like. If a care giver is watching another child, for example, or is distracted in some way, the buckle may become unfastened by either the child, or someone else without the care giver knowing.

Referring now to the drawings and in particular, FIG. 1, there is shown one embodiment of a child car seat safety system 100 for use with a vehicle 102. The system 100 includes a buckle sensor 104 in buckle assembly 106 of car seat 108. Buckle assembly 106 may comprise one or more receivers and one or more fasteners inserted into the one or more receivers. In many child safety seats, there are generally two belts 110 which fasten together at the child's chest, and again between the legs. The buckle assembly 106 comprises a receiver 112 which extends through an opening near the front of the car seat 108 for receiving one or more fasteners 114 on the belts 110. The belts are also generally fastened at the child's chest into a chest buckle 116, and then extend upward over the child's shoulders.

Buckle sensor 104 is configured to determine whether the components of buckle assembly 106 are fastened or not, and more particularly, whether the one or more fasteners 114 are received and fully fastened within the buckle assembly 106. In addition to buckle sensor 104, there may also be a second sensor 118 in chest buckle 116. The second sensor 118 may also be configured to determine whether the chest buckle 116 is fastened. The second sensor 118 may be connected with buckle sensor 104. In some embodiments, buckler sensor 104 and second sensor 118 may be connected via a wireless communication connection, such as, e.g., BLUETOOTH® or other wireless communication systems known to those skilled in the art, such that wires are not required to be incorporated into the belts 110 of car seat 108. In a car seat having both a buckle assembly 106 and chest buckle 118, if either of the buckle assembly 106 or chest buckle 118 are not fastened completely or properly, the child fastened into seat 108 is not properly fastened and accordingly could be at risk of injury if the vehicle 102 is in an accident or experiences dangerous driving conditions.

The safety system 100 may comprise a processor coupled with the buckle sensor 104. The processor may be coupled to the buckle assembly 106, or may be embedded into the buckle assembly 106. In some embodiments, the buckle sensor 104 may be incorporated with the processor. The processor may comprise a transceiver, either coupled with or incorporated into the processor, the transceiver configured to communicate with a control system 120 of vehicle 102, wherein the control system 120 may include a processor and other computing components. Some components of the control system 120 may be incorporated in the dashboard and may be incorporated with a user interface and instruments located therein and other components may be underneath a hood such as a power supply, relay, and other components which may be placed beneath the hood. Car control systems have become more complex as technology advances, so in some cars, all of the controls and instruments may be networked with a central computer system of the vehicle. The communication between the transceiver and the control system 120 may be via a wireless connection, such as, e.g., BLUETOOTH® or short-range wireless communication systems known to those skilled in the art. The transceiver may also be configured for wired communication or may be networked with the control system 120 or be incorporated as part of a central vehicle computing system via a wiring system within the vehicle 102.

The safety system 100 may comprise a key fob 122. Key fob 122 may comprise a microprocessor and be a custom key fob configured for communication with both the control system 120 and also other components of the safety system 100, such as a processor and transceiver which may be incorporated with buckle sensor 104. In some embodiments, the buckle sensor 104 may be configured to communicate directly with key fob 122. In other embodiments, the key fob may be alerted by either the control system 120 or the buckle sensor 104 under various conditions (as discussed below). The key fob 122 may provide an audible alert, such as beeping, or other various audible alerts commonly used in portable electronics. The audible alert may be configured to be at a higher decibel level than traditional key fob noise levels. In some embodiments, the key fob may be programmable such that the user may customize the style, frequency, and noise level of the audible alert. The key fob 122 may also be configured to provide a visual alert such as a blinking light, etc. and the key fob may also be configured to provide a tactile alert, such as vibration, etc. The fey fob 122 may be configured for short or longer range wireless communication with the buckle sensor 104, the control system 120, smart phone 130, or various other components.

Buckle sensor 104 may comprise a power source. The power source may be incorporated with the processor, or coupled thereto, and may comprise batteries, or other portable power supply systems. In some embodiments, the control system 120 may be configured to recharge the power source while the car seat 108 is installed in the vehicle 102, and may include a USB or other connector for charging using the vehicle's power. Likewise, a USB or similar connector may be used for direct programming of the safety system 100 and various components thereof.

An application ("app") 132 may be installed onto smart phone 130 which may provide alerts and programming options for a user of the safety system 100. The app 132 may also be configured with an online server such that the app 132 may also be accessed on a personal computing device such as a desktop 134 or laptop computer.

The safety system 100 may also be configured for communication with a mobile communication device such as smart phone 130. Some vehicles that use user voice activated control systems such as, e.g., Microsoft's SYNC® system and other short-range wireless enables control systems may be configured to automatically connect to a short-range wireless enabled device when the key is engaged in the vehicle 102 or when the wireless device is within a certain distance of the vehicle 102. Likewise, the control system 110 of vehicle 102 may include a communication connection with key fob 122 or other accessory which may be available with vehicle control systems. Some systems may comprise system-specific key fobs that can be programmed according to a user's preferred settings and individual needs. In some embodiments, a short-range communication interface may be configured for activation of the vehicle's horn. The horn interface may likewise be connected with the control system 120 and may communicate with the transceiver on the car seat 108.

In addition to short-range communication, the safety system 100 may be configured for cellular or other long-range communication with a key fob and/or a mobile device such as smart phone 130, computer 134, a tablet, or any internet connected personal computing device, for situations when the safety system 100 may need to communicate with smart phone 130 beyond a traditional short-range communication distance. Likewise, the control system 110 of vehicle 102 may include a communication connection with a key fob or other accessory which may be available with vehicle control systems.

Wireless communication systems which may be used with safety system 100 for communication between the various components and may comprise BLUETOOTH®, ZIGBEE, Radio Frequency Identification (RFID), and other short-range wireless communications systems known to those skilled in the art. In addition, the safety system 100 may be configured for communication over a cellular network system for communication with key fob and/or a mobile device such as smart phone 130, a tablet, or an internet connected personal computer, when communication is required beyond the range of most short-range wireless systems, the components may also be configured with cellular network systems Code Division Multiple Access (CDMA), Global System for Mobile Communications (GSM), digital cellular networks, LTE, and other wireless systems available for mobile communication.

The child car seat safety system 100 may be configured to send signals from the buckle sensor 104 to various components such as the car control system 120, smart phone 130, app 132, and other components which may be included or associated therewith. In most embodiments, buckle sensor 104 may be configured to initiate a signal to various components of safety system 100 under certain conditions. FIG. 2 provides an example of certain conditions that may cause the buckle sensor 104 to initiate an alert to one or more components. In one example, as discussed above, although a care provider has fastened the fasteners of the safety belt into the buckle assembly 106, the buckle may not actually be completely or properly latched and therefore not fully and properly fastened. If the buckle sensor 104 determines the fasteners are not properly and fully fastened into the buckle, a signal may be sent to one or more components. If the car seat 108 is being secured into a vehicle, once the engine is started and the ignition is "on,", the control system 120 receives the signal and provides an alert to the driver, which may be a dashboard alert, such as a visual and/or audible signal, similar to present alerts for unfastened seat belts in the driver and front passenger seats. Also, the key fob 122 may be configured to provide an alert. The smart phone 130 having the app 132 installed thereon may also receive an alert that the buckle assembly 106 is not fastened.

In another example, the buckle assembly 106 may become unfastened while the vehicle is on, either in park or in motion. The child may unfasten the belt themselves, or another passenger such as a sibling, friend, or other passenger, may unfasten the buckle. Accordingly, the buckle sensor 104 determines that the buckle is not fastened and the system may be programmed to alert one or more of the car control system, key fob, and mobile communication device, such as a smart phone. The control system 120 may provide an alert via a dashboard alert, including a visual and/or audible signal. The control system 120 and/or the key fob 122 may provide an alert via a dashboard alert, including a visual and/or audible signal. Likewise, the smart phone 130 may alert the driver via an audible and/or visual signal.

In another example, the buckle sensor 104 may initiate a signal to one or more components when the buckle assembly 106 is still fastened and the vehicle is turned off. In one example, the timing may be immediate, similar to when a key has been left in the ignition or the vehicle has not been placed into park. The buckle sensor 104 may initiate a signal to at least the control system 120, key fob 122, and smart phone 130. The alert may be audible and/or visual.

In another example, certain time intervals may be programmed for different alerts. The various time intervals may be programmed according to user settings such that certain time periods are allowed to account for various routine activities that may occur when the vehicle is turn off, such as unbuckling another passenger or removing a bag or other item from the car. After a first time period, t1, the buckle sensor 104 may initiate a signal to the control system 120 such that the control system 120 initiates a car horn to honk. Hearing the car honk may alert the care giver that something is wrong and prompt them to return to the vehicle and realize the child is still buckled into the car seat. In addition, the key fob 122 may receive a signal and provide an audible, visual, and/or tactile alert. After a second time period, t2, the control system 120 may control the windows and roll them down to allow airflow through the vehicle and when combined with the horn honking, may alert nearby persons and enable them to come to the child. After a third time period, t3, the control system 120 may initiate the vehicle's air conditioning or heating system to provide help alleviate extreme temperatures that may occur in the vehicle.

At all three of the time periods, t1, t2, and t3, the buckle sensor 104 may initiate a signal to a smart phone having the app 132 installed thereon. The alert may be an audible, visual, and/or tactile signal, similar to an alert for a text or urgent message. In some embodiments, the alert may be configured such that sound and alert length setting are over-ridden, which may be similar to when privacy or do not disturb settings are overcome. The app 132 may be configured such that it may be accessed on an interface on a personal computing device. The personal computing device may also be configured to give an alert similar to the alert given on the smart phone, such as, for example, an audible or visual alert.

Likewise, the safety system 100 may be programmed to initiate alerts when the smart phone 130 and/or key fob 132 reaches various distances away from the car seat 108 and the buckle assembly 106 is still fastened. As with the time intervals discussed above, different alerts may occur on different interfaces at different intervals. At a first distance, d1, the buckle sensor 104 may initiate a signal to the control system 120 and/or key fob that the buckle assembly 106 is still fastened and the vehicle is off and the control system 120 initiates a car horn to honk. Hearing the car honk may alert the care giver that something is wrong and prompt them to return to the vehicle and realize the child is still buckled into the car seat. In addition, the key fob may receive a signal and provide an audible, visual, and/or tactile alert. After a second distance, d2, the control system 120 may control the windows and roll them down to allow airflow through the vehicle and when combined with the horn honking, may alert nearby persons and enable them to come to the child. After a third distance, d3, the control system 120 may initiate the vehicle's air conditioning or heating system to provide help alleviate extreme temperatures that may occur in the vehicle.

At all three distances, d1, d2, and d3, the buckle sensor 104 may initiate a signal to a smart phone having the app 132 installed thereon. The alert may be an audible, visual, and/or tactile signal, similar to an alert for a text or urgent message. In some embodiments, the alert may be configured such that sound and alert length setting are over-ridden, which may be similar to when privacy or do not disturb settings are overcome. The app 132 may be configured such that it may be accessed on an interface on a personal computing device. The personal computing device may also be configured to give an alert similar to the alert given on the smart phone, such as, for example, an audible or visual alert In another example, the safety system 100 may be programmed to provide an alert while the car seat is not installed in the vehicle. For example, the car seat may be placed in a stroller or similar travel system for various outings, such as shopping, errands, or perhaps a playground or park, etc. Car givers. Many things can distract a caregiver and cause them to look away from the child in the car seat, such as talking with someone, attending to a personal matter, looking at something of importance, and various other distractions. While the care giver is looking away, the child or someone else may unfasten the buckle. Accordingly, the safety system 100 may be programmed to alert the care giver after a time period, t4 has passed after the buckle is unfastened, or perhaps the car seat is unfastened from the carrier and the car seat is a certain distance, d4, away from the key fob or smart phone.

All of the foregoing time periods, t1, t2, t3, and t4, and distances d1, d2, d3, and d4, may be programmed to different settings, customized by the care giver and other users of the safety system 100 according to their needs, habits, and various other factors that may be considered.

Other embodiments and system configurations may include additional components and capabilities. For example, the safety system 100 may include a hub controller, similar to those used in home control applications. The home hub may be paired with a controller and capable of supporting more than one car seat. In other embodiments, multiple car seats in a day care van and/or minivan and/or car may be supported via the hub controller. The hub may also support additional devices and applications and communicate via wired, wireless, short-range, and cellular technologies. In some embodiments, the safety system 100 may be able to be incorporated into a home or day care control system and existing hub controller.

Those skilled in the art to which this application relates will appreciate that other and further additions, deletions, substitutions and modifications may be made without departing from the scope of the present disclosure.

The invention claimed is:

1. A buckle assembly for use with a child safety seat, the buckle assembly comprising:
   a buckle sensor, the buckle sensor configured for determining whether fasteners of the child safety seat are secured into the buckle assembly;
   a processor coupled with the buckle sensor; and
   a transceiver coupled with the processor, the transceiver for communicating with a control system of a vehicle, the transceiver configured to:
      receive a signal from the control system, the signal indicating at least what gear the vehicle is in and whether the vehicle's ignition is "on" or "off"; and
      signal the control system after a first period of time has passed after receiving a signal that the vehicle's ignition is "off" and the fasteners remain secured into the buckle.

2. The buckle assembly according to claim 1, wherein the transceiver is configured to signal the control system when the fasteners are not fastened into the buckle while the vehicle is "on" and in a gear other than "Park".

3. The buckle assembly according to claim 2, wherein the control system is configured to initiate an audible alert from the vehicle after a first amount of time has passed.

4. The buckle assembly according to claim 2, wherein the control system is configured to initiate rolling down the windows of the car after a second amount of time has passed.

5. The buckle assembly according to claim 2, wherein the control system is configured to initiate an air conditioning system of the car after a second amount of time has passed.

6. The buckle assembly according to claim 1, wherein the transceiver comprises a wireless communication interface.

7. The buckle assembly according to claim 6, wherein the transceiver is configured to send a signal to a key fob, wherein the key fob provides at least an audible signal to the user.

8. The buckle assembly according to claim 1, wherein the transceiver is configured to communicate with a mobile communication device having an application installed thereon.

9. The buckle assembly according to claim 8, wherein the application provides an audible alert to a user of the mobile communication device.

10. The buckle assembly according to claim 8, wherein the application provides a visual alert to a user of the mobile communication device.

11. A child safety system for use with a vehicle, the safety system comprising:
    a control system coupled with the vehicle;
    a buckle for receiving fasteners of a child safety seat therein;
    a buckle sensor, the buckle sensor configured for determining whether the fasteners of the child safety seat are secured into the buckle;
    a processor coupled with the buckle sensor; and
    a transceiver coupled with the processor, the transceiver for communicating with the control system, the transceiver configured to:
       receive a signal from the control system, the signal indicating at least what gear the vehicle is in and whether the vehicle's ignition is "on" or "off"; and
       signal the control system after a first period of time has passed after receiving a signal that the vehicle's ignition is "off" and the fasteners remain secured into the buckle.

12. The child safety system according to claim 11, wherein the transceiver is configured to signal the control system when the fasteners are not fastened into the buckle while the vehicle is "on" and in a gear other than "Park".

13. The child safety system according to claim 12, wherein the control system is configured to initiate an audible alert from the vehicle after a first amount of time has passed.

14. The child safety system according to claim 12, wherein the control system is configured to initiate rolling down the windows of the car after a second amount of time has passed.

15. The child safety system according to claim 12, wherein the control system is configured to initiate an air conditioning system of the car after a second amount of time has passed.

16. The child safety system according to claim 11, wherein the transceiver comprises a wireless communication interface.

17. The child safety system according to claim 16, wherein the transceiver is configured to send a signal to a key fob, wherein the key fob provides at least an audible signal to the user.

18. The child safety system according to claim 11, wherein the transceiver is configured to communicate with a mobile communication device having an application installed thereon.

19. The child safety system according to claim 18, wherein the application provides an audible alert to a user of the mobile communication device.

20. The child safety system according to claim 18, wherein the application provides a visual alert to a user of the mobile communication device.

* * * * *